United States Patent
Qian et al.

(10) Patent No.: US 11,574,203 B2
(45) Date of Patent: Feb. 7, 2023

(54) CONTENT EXPLANATION METHOD AND APPARATUS

(71) Applicant: Huawei Technologies Co., Ltd., Shenzhen (CN)

(72) Inventors: Li Qian, Shenzhen (CN); Xueyan Huang, Shenzhen (CN); Zhaopeng Tu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 658 days.

(21) Appl. No.: 16/586,092

(22) Filed: Sep. 27, 2019

(65) Prior Publication Data

US 2020/0027004 A1    Jan. 23, 2020

Related U.S. Application Data

(63) Continuation of application No. PCT/CN2018/080947, filed on Mar. 28, 2018.

(30) Foreign Application Priority Data

Mar. 30, 2017  (CN) .......................... 201710204050.5

(51) Int. Cl.
*G06N 5/00* (2006.01)
*G06F 16/435* (2019.01)
(Continued)

(52) U.S. Cl.
CPC .......... *G06N 5/003* (2013.01); *G06F 16/2365* (2019.01); *G06F 16/436* (2019.01); *G06F 16/438* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 9,531,841 B2* | 12/2016 | Dong | H04L 51/00 |
| 10,387,717 B2* | 8/2019 | Li | H04L 51/00 |

(Continued)

FOREIGN PATENT DOCUMENTS

| | | |
|---|---|---|
| CN | 101917585 A | 12/2010 |
| CN | 102541259 A | 7/2012 |
| CN | 102722246 A | 10/2012 |
| CN | 102945624 A | 2/2013 |

(Continued)

OTHER PUBLICATIONS

Machine Translation and Abstract of Chinese Publication No. CN102722246, Oct. 10, 2012, 8 pages.

(Continued)

*Primary Examiner* — Kim T Nguyen
(74) *Attorney, Agent, or Firm* — Conley Rose, P.C.

(57) ABSTRACT

A content explanation method and apparatus applied to content explanation includes identifying, by a content explanation apparatus, an emotion of the user, when identifying a negative emotion showing that the user is confused about delivered multimedia information, obtaining, by the content explanation apparatus, a target representation manner of target content in a target intelligence type, where the target content is content about which the user is confused in the multimedia information delivered to the user by an information delivery apparatus associated with the content explanation apparatus, and presenting, by the content explanation apparatus, the target content to the user in the target representation manner.

20 Claims, 7 Drawing Sheets

(51) Int. Cl.
*G06F 16/438* (2019.01)
*G06F 16/9535* (2019.01)
*G06F 16/23* (2019.01)

(56) References Cited

U.S. PATENT DOCUMENTS

| | | | |
|---|---|---|---|
| 10,936,645 B2* | 3/2021 | Lu | G06F 16/435 |
| 11,312,389 B2* | 4/2022 | Imaizumi | G06F 3/017 |
| 11,315,362 B2* | 4/2022 | Lee | G06V 20/56 |
| 2009/0114216 A1* | 5/2009 | Hung | A61B 5/08 600/534 |
| 2013/0162524 A1 | 6/2013 | Li et al. | |
| 2015/0242679 A1 | 8/2015 | Naveh | |
| 2018/0189398 A1 | 7/2018 | Sternberg et al. | |
| 2019/0147059 A1* | 5/2019 | Lu | G06F 16/435 707/722 |
| 2020/0027004 A1* | 1/2020 | Qian | G06F 16/436 |
| 2020/0402641 A1* | 12/2020 | Op Den Buijs | A61B 5/1112 |
| 2022/0036049 A1* | 2/2022 | Lee | A61B 5/165 |

FOREIGN PATENT DOCUMENTS

| | | |
|---|---|---|
| CN | 103873914 A | 6/2014 |
| CN | 104239304 A | 12/2014 |
| CN | 104462468 A | 3/2015 |
| CN | 104866116 A | 8/2015 |
| CN | 104901981 A | 9/2015 |
| CN | 106030642 A | 10/2016 |
| CN | 106293102 A | 1/2017 |
| CN | 106357927 A | 1/2017 |
| CN | 107092664 A | 8/2017 |
| WO | 2015127361 A1 | 8/2015 |

OTHER PUBLICATIONS

Machine Translation and Abstract of Chinese Publication No. CN104901981, Sep. 9, 2015, 21 pages.
Machine Translation and Abstract of Chinese Publication No. CN106293102, Jan. 4, 2017, 7 pages.
Foreign Communication From A Counterpart Application, Chinese Application No. 201710204050.5, Chinese Notice of Allowance dated Feb. 3, 2020, 4 pages.
Machine Translation and Abstract of Chinese Publication No. CN101917585, Dec. 15, 2010, 15 pages.
Machine Translation and Abstract of Chinese Publication No. CN102945624, Feb. 27, 2013, 15 pages.
Machine Translation and Abstract of Chinese Publication No. CN103873914, Jun. 18, 2014, 12 pages.
Machine Translation and Abstract of Chinese Publication No. CN104239304, Dec. 24, 2014, 51 pages.
Machine Translation and Abstract of Chinese Publication No. CN104462468, Mar. 25, 2015, 10 pages.
Machine Translation and Abstract of Chinese Publication No. CN104866116, Aug. 26, 2015, 15 pages.
Machine Translation and Abstract of Chinese Publication No. CN106357927, Jan. 25, 2017, 25 pages.
Machine Translation and Abstract of Chinese Publication No. CN107092664, Aug. 25, 2017, 34 pages.
Li, J., "Research on the Situational Evaluation Method of Middle School Students," Physical Motion Intelligence by Computer, CNKI, Mar. 2013, 57 pages.
Partial English Translation of Li, J., "Research on the Situational Evaluation Method of Middle School Students," Physical Motion Intelligence by Computer, CNKI, Mar. 2013, 45 pages.
Foreign Communication From A Counterpart Application, Chinese Application No. 201710204050.5, Chinese Office Action dated Apr. 22, 2019, 9 pages.
Foreign Communication From A Counterpart Application, PCT Application No. CN2018/080947, English Translation of International Search Report dated Jul. 4, 2018, 2 pages.
Foreign Communication From A Counterpart Application, PCT Application No. CN2018/080947, English Translation of Written Opinion dated Jul. 4, 2018, 6 pages.

* cited by examiner

CONTENT EXPLANATION METHOD AND APPARATUS

CROSS-REFERENCE TO RELATED APPLICATIONS

This application is a continuation application of International Application No. PCT/CN2018/080947, filed on Mar. 28, 2018, which claims priority to Chinese Patent Application No. 201710204050.5, filed on Mar. 30, 2017, both of which are hereby incorporated by reference in their entireties.

TECHNICAL FIELD

This application relates to the communications field, and in particular, to a content explanation method and apparatus.

BACKGROUND

Rapid development of artificial intelligence technologies, for example, maturity of an expression recognition technology, enables a machine to dynamically capture an emotion and a status of a user in real time. In addition, the expression recognition technology is applied to a scenario of human-computer interaction, and content presented by a machine is adjusted based on an identified emotion and status of a user in order to implement more effective human-computer interaction.

Currently, when presenting content to a user (including machine playback or a personal speech), a machine in human-computer interaction with the user obtains a point, about which the user is confused, in the presented content by identifying an expression of the user, and simply repeats the identified point of confusion for the user's next time of understanding.

However, in most of the time, it is not the case that the user does not hear a statement clearly. Therefore, simple repetition cannot help the user to understand the content effectively, which causes low effectiveness of human-computer interaction.

SUMMARY

Embodiments of this application provide a content explanation method and apparatus in order to help a user to effectively understand presented content, and improve effectiveness of human-computer interaction.

To achieve the foregoing objective, this application uses the following technical solutions.

According to a first aspect, a content explanation method is provided, where the method is applied to a content explanation apparatus, and the content explanation apparatus is associated with an information delivery apparatus, the information delivery apparatus is configured to deliver multimedia information to a user, and the content explanation apparatus is configured to explain, during multimedia information delivery to the user by the information delivery apparatus, multimedia information about which the user is confused. The content explanation method provided in this application specifically includes identifying, by the content explanation apparatus, an emotion of the user, when the content explanation apparatus identifies, during the information delivery to the user, a negative emotion showing that the user is confused about the delivered multimedia information, obtaining, by the content explanation apparatus, a target representation manner of target content in a target intelligence type, where the target content is content about which the user is confused in the multimedia information delivered to the user by the information delivery apparatus, and the target intelligence type is one of at least two psychological intelligence types preset in an intelligence type library, and finally presenting, by the content explanation apparatus, the target content to the user in the target representation manner.

According to the content explanation method provided in this application, the emotion of the user is first identified using an emotion recognition technology, and when the negative emotion of the user is identified, it is determined that the user is confused about the target content, then with the aid of intelligence types in psychology that are used to reflect understanding capabilities of different people on different content presentation manners, the target content is converted into the target representation manner in the target intelligence type that is easy to be understood by the user, and then the target content about which the user is confused is presented to the user in the obtained target representation manner. The intelligence types reflect the understanding capabilities of different people on different content presentation manners. Therefore, content is converted based on an intelligence type. Provided that the converted target representation manner is a conversion manner in an intelligence type of the user, an understanding capability of the user on the target content may be greatly improved, and confusion of the user is cleared up such that effectiveness of human-computer interaction is significantly improved.

The content explanation apparatus is configured to explain the multimedia information delivered to the user by the information delivery apparatus associated with the content explanation apparatus in order to improve the user's understanding of received information. In the emotion recognition technology, numerous emotions are defined, including a positive emotion and a negative emotion. The positive emotion refers to a feeling that leads to a positive effect, is used to indicate an understanding of received information, and may include, but is not limited to, joy, happiness, excitement, or the like. The negative emotion refers to a feeling that leads to a negative effect, is used to indicate confusion about received information, and may include, but is not limited to, anxiety, nervousness, anger, frustration, sadness, pain, or the like.

It should be noted that the foregoing delivered multimedia information has different definitions in different scenarios. During the multimedia information delivery to the user by the information delivery apparatus, it is defined that the delivered multimedia information is multimedia information delivered to the user by the information delivery apparatus. During multimedia information explanation to the user by the content explanation apparatus, it is defined that the delivered multimedia information is multimedia information explained to the user by the content explanation apparatus.

Correspondingly, a process of delivering the multimedia information to the user may include a process of delivering the multimedia information to the user by the information delivery apparatus or a process of explaining the multimedia information to the user by the content explanation apparatus. The process of delivering the multimedia information to the user may be defined based on different scenarios, and is not specifically limited in this embodiment of this application.

With reference to the first aspect, in a possible implementation, the target intelligence type may be a pre-stored static intelligence type of the user. When the target intelligence type is the static intelligence type of the user, the target intelligence type reflects an actual understanding capability of the user. When the target content is converted into the target representation manner in the target intelligence type, the user has the best understanding of the target content, and efficiency of the human-computer interaction is better improved.

The pre-stored static intelligence type of the user may be an intelligence type of the user that is obtained in a questionnaire or test manner and recorded and stored when the user initially uses the content explanation apparatus. A target representation manner in the static intelligence type of the user is a representation manner in which an understanding capability of the user is the highest.

With reference to the first aspect, in a possible implementation, the target intelligence type may be an intelligence type that is in a preset intelligence type sequence and that is not used by the content explanation apparatus to convert the target content for the user. The preset intelligence type sequence includes at least one intelligence type. For the target content about which the user is confused, an intelligence type that is not used by the content explanation apparatus to convert the target content for the user may better meet an understanding capability of the user. When the target content is converted into the target representation manner in the target intelligence type, the user's understanding of the target content is improved, and the efficiency of the human-computer interaction is better improved.

With reference to the first aspect or any one of the foregoing possible implementations, in a possible implementation, after the identifying, by the content explanation apparatus, an emotion of the user, the content explanation method provided in this application may further include, if the content explanation apparatus identifies a positive emotion showing that the user is clear about the delivered multimedia information, adding, by the content explanation apparatus, 1 to a counter of an intelligence type that is in the intelligence type library of the user and to which a representation manner of the multimedia information belongs when the content explanation apparatus identifies the positive emotion of the user. Values of counters of different intelligence types of the user are recorded in the intelligence type library. The intelligence type library is configured for the user, and emotion feedbacks of the user on different representation manners are tracked and identified, and are recorded in the counters in the intelligence type library in order to dynamically update the intelligence type of the user.

With reference to the first aspect or any one of the foregoing possible implementations, in a possible implementation, after the adding, by the content explanation apparatus, 1 to a counter of an intelligence type that is in the intelligence type library of the user and to which a representation manner of the multimedia information belongs when the content explanation apparatus identifies the positive emotion of the user, the content explanation method provided in this application may further include, at a preset moment, or when a counter value in the intelligence type library is greater than or equal to a preset threshold, updating the static intelligence type of the user to an intelligence type whose counter value is the highest in the intelligence type library. The static intelligence type of the user is updated based on a real-time record of the intelligence type library such that when the intelligence type of the user changes, an explanation result of the content explanation apparatus better meets a most recent understanding capability of the user.

With reference to the first aspect or any one of the foregoing possible implementations, in a possible implementation, before the obtaining, by the content explanation apparatus, a target representation manner of target content in a target intelligence type, the content explanation method provided in this application may further include separately recording, by the content explanation apparatus in a segmented manner based on a preset period, the multimedia information delivered to the user by the information delivery apparatus associated with the content explanation apparatus, to obtain an information segment. The content about which the user is confused in the multimedia information delivered to the user by the information delivery apparatus associated with the content explanation apparatus provided in this application specifically includes N information segments including a target information segment, where a moment at which the negative emotion is identified is included in a recording period of the target information segment, and the negative emotion is identified in a process of recording the target information segment. N is greater than or equal to 1. Considering a time-consuming process of identifying an emotion, the N information segments including the target information segment are defined, and include actual multimedia information content about which the user is confused such that an information segment to be explained by a content explainer better meets requirements of the user.

Optionally, the N information segments including the target information segment may be N information segments on a time axis that include the target information segment and N−1 information segments previous to the target information. Optionally, the N information segments including the target information segment may be N information segments on a time axis that include the target information segment and all information segments that are subsequent to the target information and that are delivered to the user by the information delivery apparatus.

With reference to the first aspect or any one of the foregoing possible implementations, in a possible implementation, before the obtaining, by the content explanation apparatus, a target representation manner of target content in a target intelligence type, the content explanation method provided in this application may further include, when the negative emotion of the user is identified, obtaining an information segment within preset duration before a moment at which the content explanation apparatus identifies the negative emotion of the user in the multimedia information delivered to the user by the information delivery apparatus, and using the information segment as the target content. In this implementation, the content explanation apparatus does not need to record in real time the multimedia information delivered to the user by the information delivery apparatus, but only needs to obtain, when the negative emotion is identified, the target content corresponding to the negative emotion, thereby improving a processing effect and saving storage space.

In an embodiment, the obtaining an information segment within preset duration before a moment at which the content explanation apparatus identifies the negative emotion in the multimedia information delivered to the user by the information delivery apparatus may be sending, by the content explanation apparatus, request information to the information delivery apparatus, and feeding back, by the information delivery apparatus to the content explanation apparatus, the information segment in the preset duration before the moment at which the content explanation apparatus identifies the negative emotion.

With reference to the first aspect or any one of the foregoing possible implementations, in a possible implementation, before the obtaining, by the content explanation apparatus, a target representation manner of target content in a target intelligence type, the content explanation method provided in this application may further include converting the target content into content in a text form. Because the content in the text form is convenient for representation manner conversion, content explanation efficiency is improved.

With reference to the first aspect or any one of the foregoing possible implementations, in a possible implementation, a specific implementation of the obtaining, by the content explanation apparatus, a target representation manner of target content in a target intelligence type may be obtaining, by the content explanation apparatus, the target content, obtaining the target intelligence type, and then converting the target content through sequence-to-sequence learning, to obtain the target representation manner of the target content in the target intelligence type. The sequence-to-sequence learning is a learning process from a source sequence to a target sequence. Typical applications may include machine translation, speech recognition, dialogue, automatic image description generation, and the like.

With reference to the first aspect or any one of the foregoing possible implementations, in a possible implementation, the content explanation method provided in this application may further include, when the content explanation apparatus identifies the negative emotion of the user, controlling, by the content explanation apparatus, the information delivery apparatus to stop information delivery to the user, and when the emotion of the user becomes positive, controlling, by the content explanation apparatus, the information delivery apparatus to resume the information delivery to the user. The control process may be implemented by sending an instruction.

According to a second aspect, an embodiment of this application provides a content explanation apparatus. The content explanation apparatus may implement functions of the content explanation apparatus in the foregoing method example. The functions may be implemented by hardware or may be implemented by executing corresponding software by hardware. The hardware or the software includes one or more modules corresponding to the foregoing functions.

With reference to the second aspect, in a possible implementation, a structure of the content explanation apparatus includes a processor and a transceiver, and the processor is configured to support the content explanation apparatus to perform the corresponding functions in the foregoing method. The transceiver is configured to support communication between the content explanation apparatus and another network element. The content explanation apparatus may further include a memory. The memory is configured to be coupled to the processor, and stores a program instruction and data that are necessary for the content explanation apparatus.

According to a third aspect, an embodiment of this application provides a computer storage medium. The computer storage medium is configured to store a computer software instruction used for the functions of the foregoing method example, and the computer software instruction includes a program used to execute the designs in the foregoing aspects.

The solution provided in the second aspect or the third aspect is used to implement the content explanation method provided in the first aspect, and therefore, beneficial effects that are the same as those of the first aspect can be achieved. Details are not described herein again.

DESCRIPTION OF EMBODIMENTS

Currently, an artificial intelligence identification technology has been introduced in the field of human-computer interaction, and an expression recognition technology is used to identify an emotion of a user during human-computer interaction in order to improve an effect of human-computer interaction. Currently, during human-computer interaction, if an emotion showing that the user is confused is identified, usually, information delivered to the user is simply repeated for the user's understanding one more time. However, simple repetition cannot help the user to understand content effectively, and therefore advantages of the artificial intelligence technology are not brought into full play in human-computer interaction.

Based on this, a basic principle of this application is as follows. With the aid of an intelligence type and an expression recognition technology in psychology, when a negative emotion of a user is identified during human-computer interaction, content about which the user is confused is converted into a representation manner in an intelligence type that is easier to be understood by the user, and then the content about which the user is confused is presented to the user in the converted representation manner. Since different people have different understanding capabilities on content in different representation manners, the content is explained based on an intelligence type, and the explained content helps to improve an understanding procedure of the user in order to improve efficiency of human-computer interaction.

Figure 1:
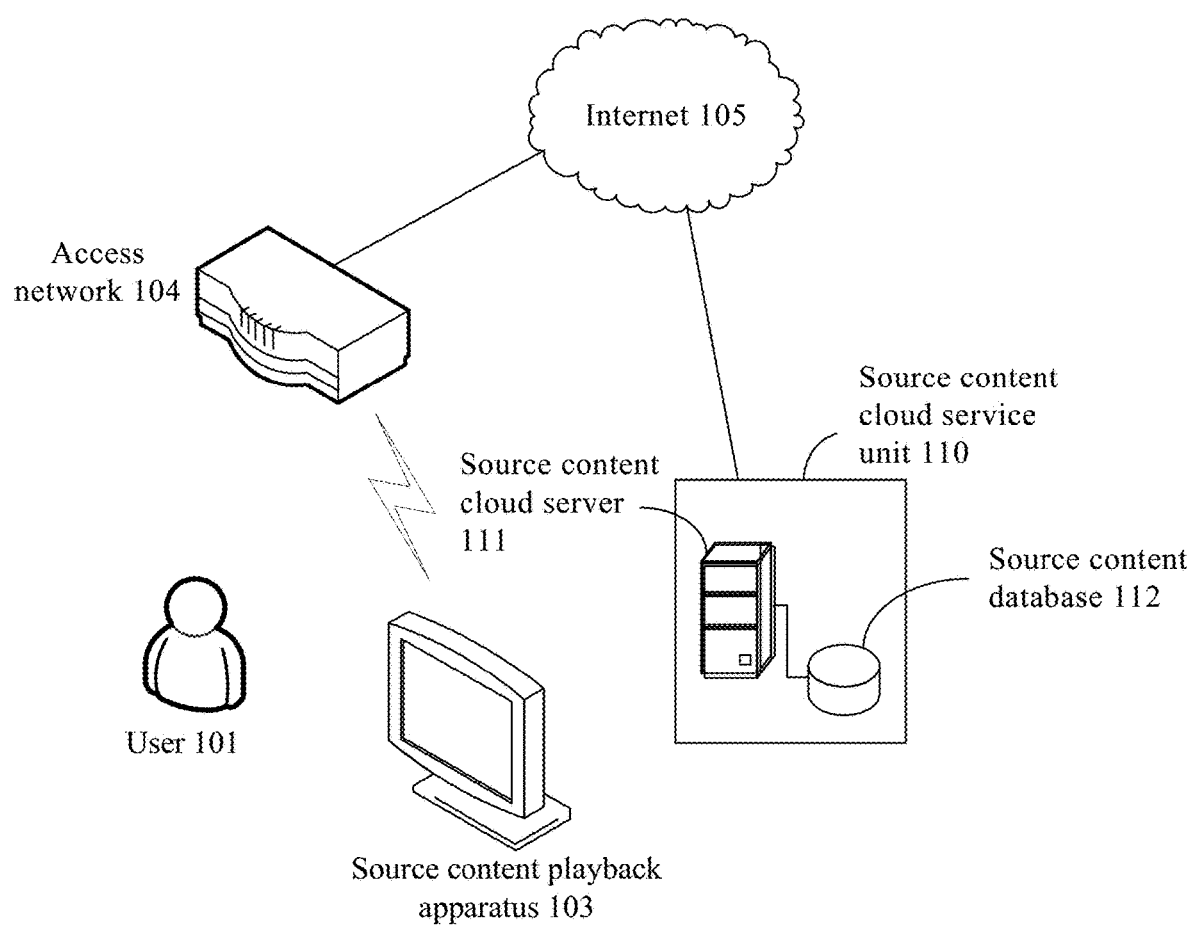
FIG. 1 is a schematic diagram of an information propagation system architecture according to other approaches.

A content explanation method provided in an embodiment of this application is applied to an information propagation system architecture shown in FIG. 1. As shown in FIG. 1, the information propagation system architecture includes a user 101, a source content playback apparatus 103, an access network 104, the Internet 105, and a source content cloud service unit 110 including a source content cloud server 111 and a source content database 112.

The source content playback apparatus 103 may be an audio/video player, a third-party speaker, or the like. The source content playback apparatus 103 is configured to deliver multimedia information to the user 101. The source content playback apparatus 103 is also an information delivery apparatus described in a subsequent embodiment. When the source content playback apparatus 103 is a machine device, the source content playback apparatus 103 may have a storage apparatus itself or may be externally connected to a storage apparatus to store source content, or may obtain source content from the source content cloud service 110 using the Internet 105. The source content playback apparatus 103 can access the Internet 105 using the access network 104. The source content cloud service unit 110 is configured to provide the source content.

It should be noted that the multimedia information may include playable information such as audio and video information. Neither content nor types of the multimedia information are specifically limited in this embodiment of this application.

Figure 2:
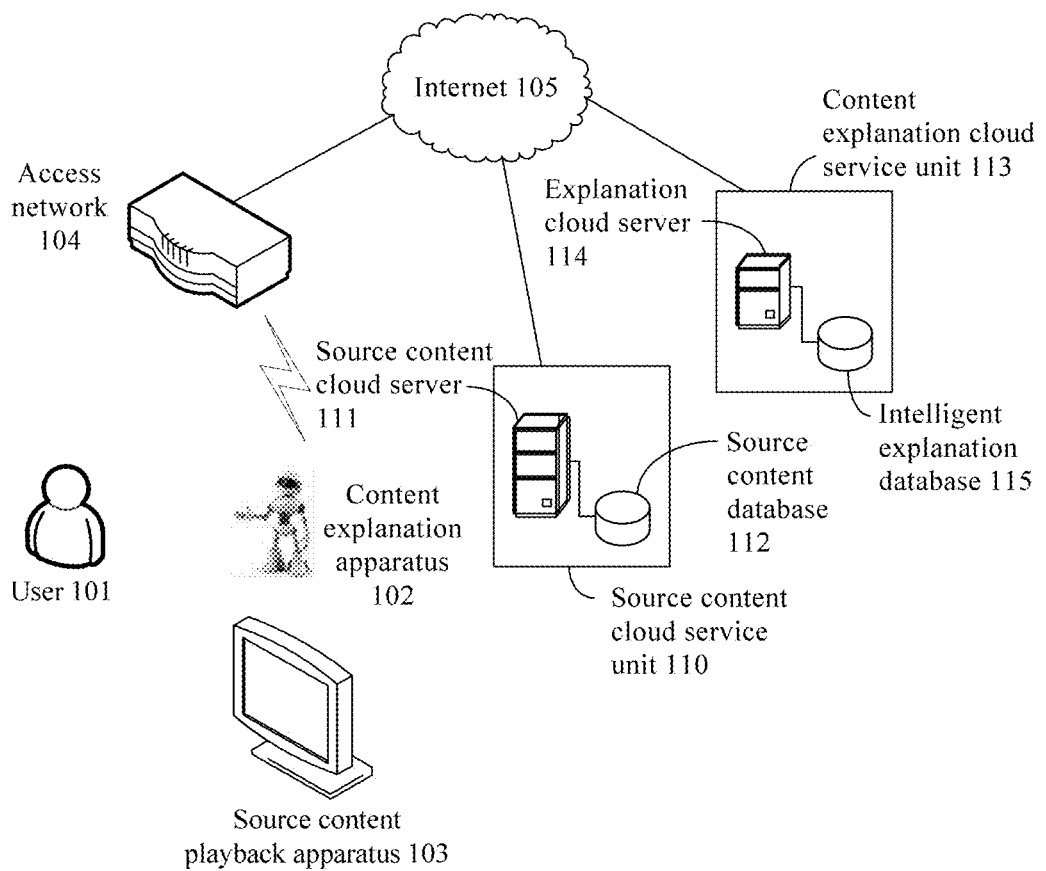
FIG. 2 is a schematic diagram of a human-computer interaction system architecture according to an embodiment of this application.

Further, a machine explanation apparatus is added to the information propagation system architecture shown in FIG. 1, to explain, to the user 101 using human-computer interaction, the multimedia information delivered to the user 101 by the source content playback apparatus 103. After the machine explanation apparatus is added to the information propagation system architecture shown in FIG. 1, a human-computer interaction system architecture is shown in FIG. 2. In the human-computer interaction system architecture shown in FIG. 2, a content explanation apparatus 102, and a content explanation cloud service unit 113 including an intelligent explanation cloud server 114 and an intelligent explanation database 115 are added in comparison to the information propagation system architecture shown in FIG. 1.

The content explanation apparatus 102 may be a robot or another device for human-computer interaction. The content explanation apparatus 102 is associated with the source content playback apparatus 103 (that is, the information propagation apparatus), and the content explanation apparatus 102 is configured to perform the content explanation method provided in this application, to explain, to the user 101, the multimedia information delivered to the user by the source content playback apparatus 103. The content explanation apparatus 102 can access the Internet 105 using the access network 104. The content explanation apparatus 102 can control to suspend a playback action of the source content playback apparatus 103 using an instruction when providing an explanation to the user 101, and then control the source content playback apparatus 103 to continue playing the source content after the explanation is completed.

Optionally, the source content playback apparatus 103 and the content explanation apparatus 102 may be a same physical entity, that is, a computing apparatus having a screen that can play content. In this case, the content explanation apparatus 102 may obtain, from the inside of the physical entity of the content explanation apparatus 102, the multimedia information delivered to the user. Certainly, the source content playback apparatus 103 and the content explanation apparatus 102 may also be two standalone physical entities. In this case, the content explanation apparatus 102 may obtain, using an audio or image sensor such as a camera or a microphone, the source content played by the source content playback apparatus 103, to obtain the multimedia information delivered to the user 101.

Further, when the source content playback apparatus 103 and the content explanation apparatus 102 are two standalone physical entities, the source content playback apparatus 103 and the content explanation apparatus 102 may be two physical entities connected using the network 104, or may be two physical entities connected in a wired manner. A connection manner of the source content playback apparatus 103 and the content explanation apparatus 102 when they are used as two independent physical entities is not specifically limited in this embodiment of this application.

Figure 3:
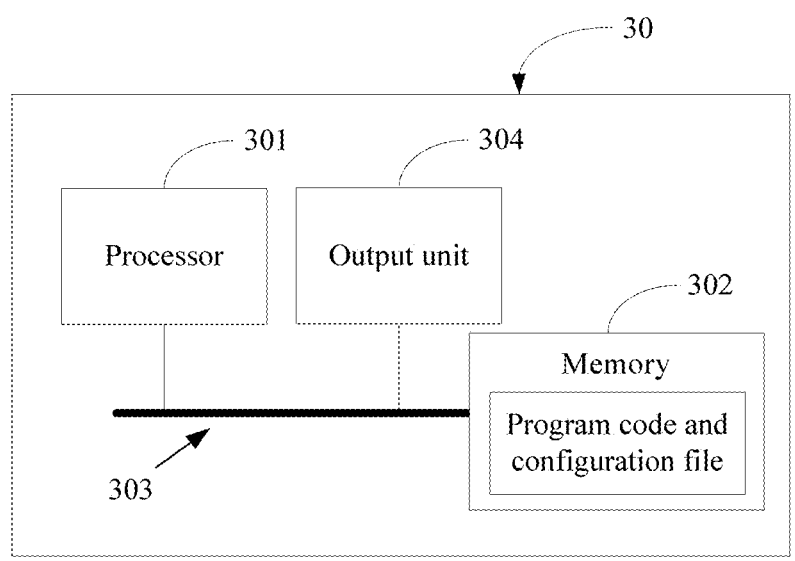
FIG. 3 is a schematic structural diagram of a content explanation apparatus according to an embodiment of this application.

FIG. 3 shows a schematic structural diagram of a content explanation apparatus 30 related to the embodiments of this application. The content explanation apparatus 30 may be the content explanation apparatus 102 in the human-computer interaction system architecture shown in FIG. 2.

As shown in FIG. 3, the content explanation apparatus 30 may include a processor 301, a memory 302, a communications bus 303, and an output unit 304.

The memory 302 is configured to store program code and transmit the program code to the processor 301 such that the processor 301 executes the program code to implement various functions of the content explanation apparatus 30. The memory 302 may be a volatile memory, for example, a random access memory (RAM), or a non-volatile memory, for example, a read-only memory (ROM), a flash memory, a hard disk drive (HDD), or a solid state drive (SSD), or a combination of the foregoing types of memories.

The processor 301 is a control center of the content explanation apparatus 30, may be a central processing unit (CPU) or an application-specific integrated circuit (ASIC), or may be configured into one or more integrated circuits that implement this embodiment of this application, for example, one or more microprocessors (DSP) or one or more field programmable gate arrays (FPGA). The processor 301 may run or execute the program code stored in the memory 302 and invoke data stored in the memory 302, to implement various functions of the content explanation apparatus 30.

The communications bus 303 may be an industry standard architecture (ISA) bus, a peripheral component interconnect (PCI) bus, an extended industry standard architecture (EISA) bus, or the like. The bus 303 may be divided into an address bus, a data bus, a control bus, and the like. For ease of notation, only one thick line is used in FIG. 3, but it does not mean that there is only one bus or one type of bus.

The output unit 304 may be physical hardware configured to present content to a user, such as a speaker or a display in a machine.

The processor 301 is specifically configured to identify an emotion of the user, when identifying a negative emotion showing that the user is confused about multimedia information delivered by an information delivery apparatus, obtain a target representation manner of target content in a target intelligence type, where the target content is content about which the user is confused in the multimedia information delivered to the user by the information delivery apparatus associated with the content explanation apparatus 30, and present the target content to the user in the target representation manner using the output unit 304.

The following describes in detail the embodiments of the present disclosure with reference to accompanying drawings.

Figure 4:
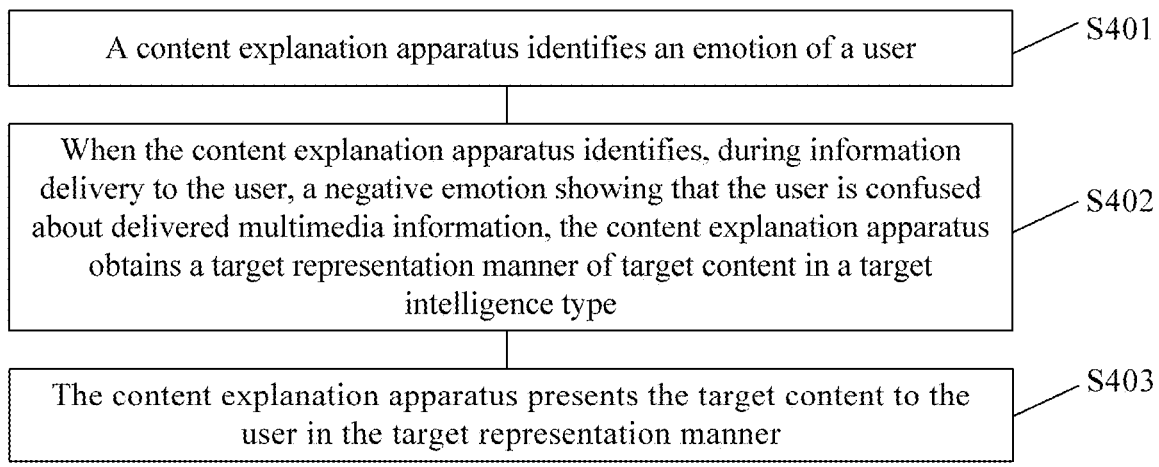
FIG. 4 is a schematic flowchart of a content explanation method according to an embodiment of this application.

In an aspect, an embodiment of this application provides a content explanation method, which is applied to the content explanation apparatus 102 in the human-computer interaction system architecture shown in FIG. 2. As shown in FIG. 4, the method may include the following steps.

S401. The content explanation apparatus identifies an emotion of a user.

In S401, the content explanation apparatus captures and identifies an expression feedback of the user on received multimedia information. The multimedia information received by the user is multimedia information delivered to the user by an information delivery apparatus.

Further, in S401, the content explanation apparatus first captures an expression of the user, and then identifies the expression of the user to obtain the emotion of the user. Detailed description is given below.

Optionally, the content explanation apparatus can continuously track and capture an expression video of the user using a camera. Certainly, a hardware unit used by the user to capture the expression video of the user may be referred to as another name, which is not specifically limited in this embodiment of this application.

In an embodiment, the content explanation apparatus continuously analyzes the captured expression video of the user, and identifies a current expression, to obtain an emotion corresponding to the expression. A correspondence between the expression and the emotion may be preset, which is not specifically limited in this embodiment of this application.

For example, common implementation methods of expression recognition include, but are not limited to, the following four implementation methods.

Implementation method 1: Deformation feature extraction method, where in this method, some special deformation information of a human face, for example, a texture change or a geometric deformation, is extracted to identify an expression.

Implementation method 2: Statistical feature extraction method, where in this method, features of a facial expression image are described using a statistical method, to identify an expression.

Implementation method 3: Motion feature extraction method, where in this method, motion information of some characteristic regions or characteristic points, for example, an optical flow change of a characteristic region or a motion distance of a characteristic point, is extracted to identify an expression.

Implementation method 4: Model feature extraction method, where in this method, a two-dimensional or three-dimensional model is built on the basis of a human face, and a change of a model parameter is adjusted to match a human face part in a human face image in order to determine an expression.

It should be noted that the foregoing four methods for implementing the expression recognition are merely examples rather than a limitation to a specific implementation method of the expression recognition.

Further, when identifying, in S401, a positive emotion showing that the user is clear about the delivered multimedia information, the content explanation apparatus keeps performing S401 to identify the emotion of the user. When identifying, in S401, a negative emotion showing that the user is confused about the multimedia information delivered by the information delivery apparatus, the content explanation apparatus performs S402.

It should be noted that the foregoing delivered multimedia information has different definitions in different scenarios. During the multimedia information delivery to the user by the information delivery apparatus, it is defined that the delivered multimedia information is multimedia information delivered to the user by the information delivery apparatus. During multimedia information explanation to the user by the content explanation apparatus, it is defined that the delivered multimedia information is multimedia information explained to the user by the content explanation apparatus.

Correspondingly, a process of delivering the multimedia information to the user may include a process of delivering the multimedia information to the user by the information delivery apparatus or a process of explaining the multimedia information to the user by the content explanation apparatus. The process of delivering the multimedia information to the user may be defined based on different scenarios, and is not specifically limited in this embodiment of this application.

Definitions of the positive emotion and the negative emotion may be configured according to requirements in an embodiment. Any emotion considered to show that the user is confused about received multimedia information and requires the content explanation apparatus to provide a content explanation may be defined as a negative emotion.

For example, the positive emotion refers to a feeling that leads to a positive effect, and may include, but is not limited to, joy, happiness, excitement, or the like. The negative emotion refers to a feeling that leads to a negative effect, and may include, but is not limited to, anxiety, nervousness, anger, frustration, sadness, pain, or the like. Specific content of the positive emotion and the negative emotion is not specifically limited in this embodiment of this application.

S402. When the content explanation apparatus identifies, during information delivery to the user, a negative emotion showing that the user is confused about delivered multimedia information, the content explanation apparatus obtains a target representation manner of target content in a target intelligence type.

Figure 5:
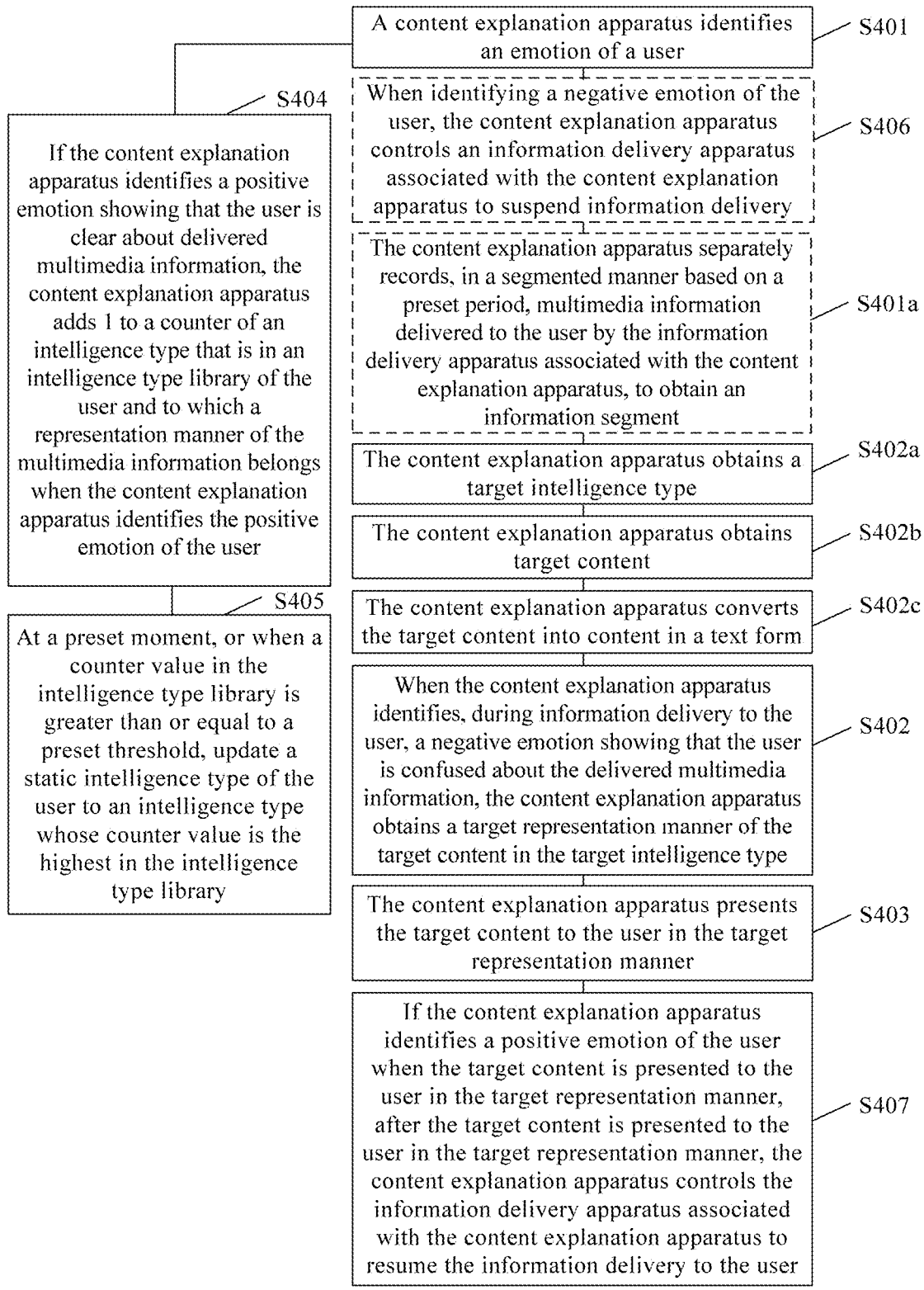
FIG. 5 is a schematic flowchart of another content explanation method according to an embodiment of this application.

Further, a specific process of performing S402 is shown in FIG. 5. Before S402, the content explanation method provided in this embodiment of this application may further include S402a of obtaining the target intelligence type and S402b of obtaining the target content. Detailed description is given below. There is no limitation to an order of performing S402a and S402b, which may be performed concurrently or performed sequentially, and this is not specifically limited in this embodiment of this application. FIG. 5 is merely an example order of performing S402a and S402b.

S402a. The content explanation apparatus obtains the target intelligence type.

The intelligence type is proposed in psychology to differentiate tendencies of understanding capabilities of different people on different content presentation manners. Currently, eight intelligence types are proposed to differentiate tendencies of understanding capabilities of different people on different content presentation manners, and include a verbal-linguistic intelligence type (people who have a high verbal-linguistic intelligence are good at reading, enjoy reading content in verbal form and playing a word game, and are good at writing a poem or a story), a logical-mathematical intelligence type (people who have a high logical-mathematical intelligence are rational, good at calculation, and sensitive to numbers), a musical-rhythmic intelligence type (people who have a high musical-rhythmic intelligence have sensitivity to rhythms and sounds, like music, and have higher learning efficiency in an environment with music), a visual-spatial intelligence type (people who have a high visual-spatial intelligence have sensitivity to surroundings, enjoy reading a graph, and are good at drawing), a bodily-kinesthetic intelligence type (people who have a high bodily-kinesthetic intelligence are good at using their own bodies and like sports, making things, and touching), an interpersonal intelligence type (people who have a high interpersonal intelligence are good at understanding and communicating with others), an intrapersonal intelligence type (people who have a high intrapersonal intelligence enjoy thinking independently and setting goals by themselves), and a naturalistic intelligence type (people who have a high naturalistic intelligence are interested in natural creatures on the planet). The solution of this application is an application of the intelligence type classification theory. When the multimedia information received by the user is presented in a manner of an intelligence type of the user, the user can understand the received multimedia information most quickly and effectively.

Optionally, content of the target intelligence type and a determining solution thereof may include the following two cases.

Case 1: The target intelligence type may be a pre-stored static intelligence type of the user. The static intelligence type of the user may be obtained in a static manner. When the user initially uses the content explanation apparatus, the content explanation apparatus may obtain the static intelligence type of the user in a questionnaire or test manner, and pre-store the static intelligence type into the content explanation apparatus. In S402, the pre-stored static intelligence type of the user can be read directly.

Case 2: The target intelligence type may be an intelligence type that is in a preset intelligence type sequence and that is not used by the content explanation apparatus to convert the target content for the user. The preset intelligence type sequence includes at least one intelligence type. The preset intelligence type sequence is statically obtained through pre-configuration. The intelligence type that is not used by the content explanation apparatus to convert the target content for the user is an intelligence type that has not yet been used in a process of explaining the target content to the user by the content explanation apparatus. If the content explanation apparatus explains the target content for the first time, all intelligence types in the preset intelligence type sequence are intelligence types that are not used by the content explanation apparatus to convert the target content for the user. If the content explanation apparatus already uses an intelligence type 1 to explain the target content to the user, but the user is still confused, the target intelligence type is an intelligence type other than the intelligence type 1 in the preset intelligence type sequence.

Optionally, when there are at least two intelligence types that are in the preset intelligence type sequence and that are not used by the content explanation apparatus to convert the target content for the user, the target intelligence type may be determined by randomly selecting one from the at least two intelligence types that are not used by the content explanation apparatus to convert the target content for the user, or by selecting an intelligence type with a high priority in descending order of priorities from the at least two intelligence types that are not used by the content explanation apparatus to convert the target content for the user.

Priorities of the intelligence types in the preset intelligence type sequence may be determined according to requirements in an embodiment, and this is not specifically limited in this embodiment of this application. For example, the priorities of the intelligence types in the preset intelligence type sequence may be priorities preset based on intelligence type distribution of normal persons according to statistical data. Alternatively, the priorities of the intelligence types in the preset intelligence type sequence may be priorities that are of intelligence types in a preset intelligence type sequence of the user and that are configured based on intelligence type preference shown by the current user in a previous content explanation process.

Optionally, the preset intelligence type sequence may include some or all of the intelligence types proposed in psychology.

Further optionally, because the intelligence type of the user may change with time or for another reason, the static intelligence type of the user may also be updated during the multimedia information delivery to the user. If a solution of updating the static intelligence type of the user during the multimedia information delivery to the user is used, an initial value of the static intelligence type of the user may be a null value, or an initial value of the static intelligence type of the user may be a static intelligence type obtained in a static manner.

Optionally, if the initial value of the static intelligence type of the user is a null value, the target intelligence type is determined in the manner of the preset intelligence type sequence described in the foregoing case 2, and after the static intelligence type of the user is updated, an updated static intelligence type of the user is used as the target intelligence type.

Optionally, if the initial value of the static intelligence type of the user is a static intelligence type obtained in a static manner, the target intelligence type is determined in the manner of the preset intelligence type sequence described in the foregoing case 1, and the target intelligence type changes as the static intelligence type of the user is updated.

Further, a process in which the static intelligence type of the user may also be updated during the multimedia information delivery to the user specifically includes maintaining an intelligence type library for each user, where counts of different intelligence types of the user are recorded in the intelligence type library. An intelligence type library of a user includes each counter corresponding to each intelligence type of the user, and each counter is initialized to 0, indicating that the user has no particular preference for an intelligence type in an initial case. During content explanation to the user by the content explanation apparatus or during multimedia information delivery to the user by the information delivery apparatus, whether an emotion feedback of the user is positive is determined based on emotion feedbacks of the user on content explained in representation manners in different intelligence types. In this way, whether the user accepts an intelligence type corresponding to a current representation manner is determined, where a positive emotion indicates that the user accepts the intelligence type corresponding to the current representation manner, otherwise, the user does not accept the intelligence type corresponding to the current representation manner. Each time the user accepts a representation manner in an intelligence type, a counter of the intelligence type in the intelligence type library increments by 1, otherwise, no processing is performed. As time goes by, a value of a counter in the intelligence type library of the user reflects preference of the user for an intelligence type, and an intelligence type that is most preferred is a newest intelligence type of the user.

S402*b*. The content explanation apparatus obtains the target content.

The target content is content of confusion, reflected by the user's negative emotion identified in S401, in the multimedia information delivered to the user by the information delivery apparatus associated with the content explanation apparatus.

A specific definition of the target content may be configured according to requirements in an embodiment, and is not specifically limited in this embodiment of this application. Any defined content of confusion, reflected by the user's negative emotion, in the multimedia information delivered to the user is the target content mentioned in this application.

Two manners of obtaining the target content are separately described below, but they are not specific limitations to the definition of the target content.

Obtaining manner 1: The content explanation apparatus records the multimedia information delivered to the user, and obtains the target content based on a moment at which the negative emotion is identified in S401.

In the obtaining manner 1, as shown in FIG. 5, before S402b, the content explanation method provided in this embodiment of this application may further include S401a.

S401a. The content explanation apparatus separately records, in a segmented manner based on a preset period, the multimedia information delivered to the user by the information delivery apparatus associated with the content explanation apparatus, to obtain an information segment.

A length of the preset period may be configured according to requirements in an embodiment, and is not specifically limited in this embodiment of this application.

In the obtaining manner 1, based on the information segment recorded in S401a, a manner of determining the target content in S402b is determining that the target content is N information segments that include a target information segment and that are in the multimedia information delivered to the user by the information delivery apparatus associated with the content explanation apparatus. The moment at which the negative emotion is identified is included in a recording period of the target information segment, and N is greater than or equal to 1.

Optionally, the N information segments including the target information segment may be N information segments on a time axis that include the target information segment and N−1 information segments previous to the target information.

For example, after being started, the content explanation apparatus continuously and periodically records the multimedia information delivered to the user by the information delivery apparatus associated with the content explanation apparatus, to obtain an information segment (the multimedia information is recorded once every preset time period, for example, every 5 seconds). When the negative emotion of the user is identified in S401 (assuming that the negative emotion is identified at the $13^{th}$ second of information delivery), an information segment recorded at the $13^{th}$ second is synchronously marked as content about which the user is confused, and the content is used as the target content. In this example, N is equal to 1.

Synchronous marking means identifying a recording period in which a time point at which the negative emotion is identified is located. In the foregoing example of the $13^{th}$ second, a recording period corresponding to the $13^{th}$ second is a recording period from the $10^{th}$ to the $15^{th}$ seconds.

For example, after being started, the content explanation apparatus continuously and periodically records the multimedia information delivered to the user by the information delivery apparatus associated with the content explanation apparatus, to obtain an information segment (the multimedia information is recorded once every preset time period, for example, every 5 seconds). The target content is defined as N information segments that include the target information segment and that are in the multimedia information delivered to the user by the information delivery apparatus associated with the content explanation apparatus, where N is equal to 2. When the negative emotion of the user is identified in S401 (assuming that the negative emotion is identified at the $13^{th}$ second of information delivery), two information segments that are recorded in a recording period to which the $13^{th}$ second belongs and a recording period previous to the recording period are used as the target content.

Optionally, the N information segments including the target information segment may be N information segments on a time axis that include the target information segment and all information segments that are subsequent to the target information segment in the multimedia information delivered to the user by the information delivery apparatus.

For example, after being started, the content explanation apparatus continuously and periodically records the multimedia information delivered to the user by the information delivery apparatus associated with the content explanation apparatus, to obtain an information segment (the multimedia information is recorded once every preset time period, for example, every 5 seconds). When the negative emotion of the user is identified in S401 (assuming that the negative emotion is identified at the $13^{th}$ second of information delivery), all content subsequent to an information segment recorded at the $13^{th}$ second is synchronously marked as the target content.

Obtaining manner 2: When identifying the negative emotion in S401, the content explanation apparatus obtains an information segment within preset duration before a moment at which the negative emotion is identified, and uses the information segment as the target content.

In the obtaining manner 2, a specific implementation of S402b is, when identifying the negative emotion of the user, obtaining, by the content explanation apparatus, the information segment that is within the preset duration before the moment at which the negative emotion is identified and that is in the multimedia information delivered to the user, and using the information segment as the target content.

The content explanation apparatus may interact with the information delivery apparatus associated with the content explanation apparatus, to request the information delivery apparatus to send the information segment that is within the preset duration before the moment at which the negative emotion is identified.

For example, in the obtaining manner 2, the content explanation apparatus sends a request message to the information delivery apparatus associated with the content explanation apparatus, where the request message includes the moment at which the negative emotion is identified, and the information delivery apparatus feeds back, to the content explanation apparatus, the information segment that is within the preset duration before the moment at which the negative emotion is identified.

It should be noted that a length of the preset duration may be configured according to requirements in an embodiment, and is not specifically limited in this embodiment of this application. The preset duration may be determined based on duration of an emotional reaction of a human body.

It should be noted that when the content explanation apparatus explains the target content to the user, if the content explanation apparatus identifies the negative emotion showing that the user is confused about the delivered multimedia information, the target content does not change, and only the target intelligence type is changed.

Optionally, a specific implementation of S402 in which the content explanation apparatus obtains the target representation manner of the target content in the target intelligence type may be converting, by the content explanation apparatus, the target content through sequence-to-sequence learning, to obtain the target representation manner of the target content in the target intelligence type.

A sequence-to-sequence learning technology pertains to the machine learning field, and is a learning process of mapping a source sequence to a target sequence. Typical applications of the sequence-to-sequence learning technology include machine translation, speech recognition, dialogue, automatic image description generation, and the like. Any abstract knowledge such as text, image, audio, or video can be converted into a sequence in a proper manner and modeled into a vector form, and therefore the sequence is used as an input of a sequence-to-sequence learning system and finally mapped into a sequence output in a corresponding form. Therefore, in theory, this sequence-to-sequence learning technology may be used to implement the solution of dynamically converting a representation manner of the target content in real time in this embodiment of this application.

A source representation manner of the target content is indefinite, and the user may correspond to any intelligence type, that is, a converted target representation manner is also indefinite. Therefore, a plurality of sequence learning models may be used to implement conversion of different types of source conversion manners into different types of target representation manners. The content explanation apparatus selects a proper sequence learning model in S402 based on the source representation manner of the target content and the target representation manner corresponding to the intelligence type of the user, to implement the conversion of the representation manner. A corresponding sequence learning model is selected to convert a content object from the source representation manner to the target representation manner.

Figure 6:
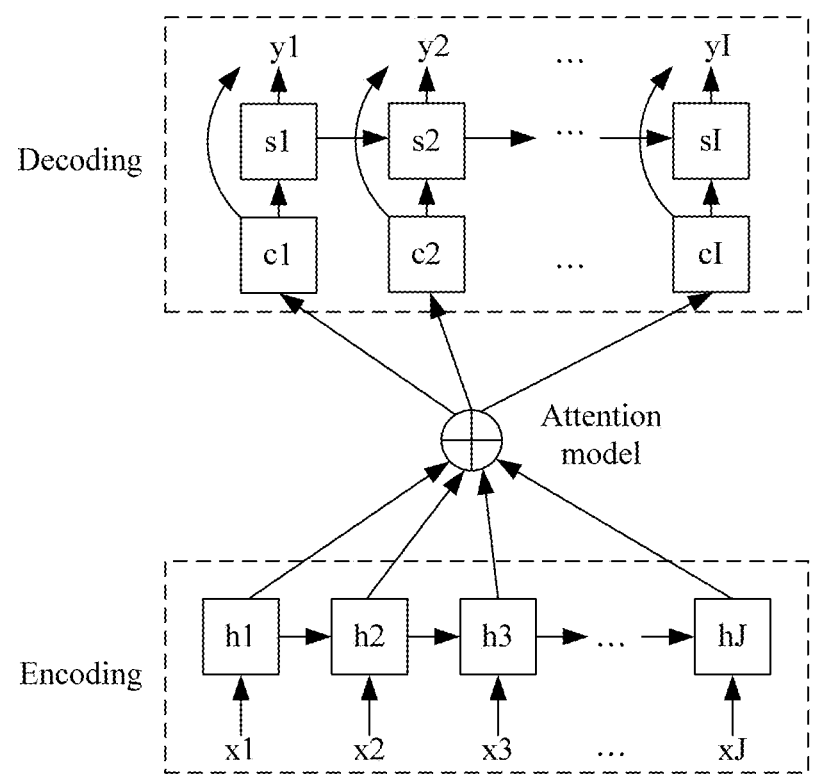
FIG. 6 is a schematic diagram of a neural network sequence learning subsystem framework according to an embodiment of this application.

Optionally, the sequence-to-sequence learning technology may have a plurality of implementations. As a specific embodiment, this application uses a sequence-to-sequence learning method based on an artificial neural network. With great progress in deep learning research, breakthroughs have been made in a plurality of tasks of sequence-to-sequence learning based on an artificial neural network (which is briefly referred to as neural network sequence learning below). Currently, all types of neural network sequence learning share a common framework, that is, a neural network sequence learning subsystem framework shown in FIG. 6. In this framework, an encoder is used to summarize a source sequence into a vector, and a decoder is used to generate a target string word for word on the basis of the vector. Using conversion of two word sequences as an example, a system framework procedure specifically includes the following encoding phase and decoding phase.

Encoding phase: The encoder converts an input word sequence $(x1, x2, x3, \ldots, xJ)$ into a semantic vector sequence $(h1, h2, h3, \ldots, hJ)$ through computational processing (for example, neural network conversion). An element $xj$ in each input word sequence corresponds to a word in target content. A semantic vector $hj$ refers to a word represented by a multidimensional vector, for example, the word "I" represented by (0.3, 0.2, −0.5, 0.1, 0.9). Any abstract knowledge can be modeled into such a compact vector form.

Decoding phase: The decoder generates one target word each time (for example, $y1, y2, \ldots, yI$ in the figure, where a quantity of target words included in the target sequence is not necessarily the same as a quantity of source words), and finally outputs an entire target sequence in a serial manner. Generation of each target word includes the following steps. First, weighted processing is performed on each source word using an attention model, that is, a weight is assigned to each source word based on a correspondence between a source word learned by a system from a large quantity of training corpora and a target word to be generated, where a larger weight indicates that a corresponding source word contributes more to generation of the target word. Further, a weighted source semantic vector (that is, a source semantic vector $hi$ is multiplied by a corresponding weight $Wi$) is used as a source context vector, that is, $(c1, c2, \ldots, cI)$ in FIG. 6, and the context vector is in one-to-one correspondence with the target word. Then, the context vector is first used to update an intermediate state (that is, $(s1, s2, \ldots)$ in the figure), where the intermediate state summarizes past translation sequence conversion information. Then a current output word $(yi)$ is predicted based on a source context vector $(ci)$, an intermediate state $(si)$, and a previous output word $(yi-1)$ together.

In conclusion, the encoder attempts to understand a source content object and summarize the source content object into a context vector, and the decoder generates a target sequence string word for word on the basis of the context vector, to implement an understanding and generating process. All of these processes are controlled using neural network parameters. These parameters are obtained through automatic training and learning of a large quantity of training corpora in an initial phase of neural network construction. A training corpus usually includes sentence pairs such as (source sentence, target sentence), and usually includes more than a hundred thousand sentence pairs in terms of scale. Generally, a larger training corpus leads to a better effect of a model.

For ease of understanding, in this embodiment of this application, implementation of conversion between two text representation manners of different styles (such as conversion between a numerical representation manner and a text representation manner) is used as an example, to describe how to implement dynamic real-time conversion of different representation manners for the target content using a neural network sequence-to-sequence learning method. It can be learned that other conversion between representation manners corresponding to different intelligence types, such as conversion between audio/video and text, may also be implemented by converting abstract knowledge such as audio/video into a source vector (for example, an image may be represented in a form of a pixel block sequence vector, and audio may be represented in a form of an audio frame sequence vector), and then the source vector is input to the neural network sequence learning subsystem in FIG. 6 for representation manner conversion.

To implement the conversion between the two text representation manners of different styles (specifically, the conversion between the numerical representation manner and the text representation manner), the sequence learning model first needs to collect a large quantity of training corpora to implement training of the model in order to obtain neural network parameters.

For example, for a training corpus of a few hundred thousand sentence pairs, word segmentation is performed on sentences at both ends (which is usually Chinese word segmentation, that is, a Chinese character sequence is segmented into separate words such that the system implements a function of automatically identifying and processing sentence meanings). Formats of corpus training are shown in Table 1 and Table 2 below.

TABLE 1

| | |
|---|---|
| Source | "There are" "6,974" "stars" "visible to naked eyes" |
| Target | "Stars" "are" "as many as" "grains of sand on the ground" |

TABLE 2

| | |
|---|---|
| Source | "There are" "18,432" "sheep" "on the grassland" |
| Target | "Sheep" "on the grassland" "are" "as many as" "grains of sand on the ground" |

A sequence learning system first automatically learns a correspondence of words based on the training corpus in order to generate and fix a series of control parameters. For example, after a training phase, the system learns that "6,974", "18,432", and the like indicate large numbers, and correspond to "are as many as grains of sand on the ground". It should be noted that the more similar word pairs co-exist, the better the system can learn a correspondence between these words. After training is completed, the parameters are fixed, and are used for subsequent online sequence conversion. After the system is well-trained and all parameters in a neural network are generated and fixed, the system can be used to implement conversion of online sequence content.

When the sequence learning model receives a source content object "There are 7,634 pigs in the farm", a word segmentation tool is first used to segment "There are 7,634 pigs in the farm" into a word sequence "There are" "7,634" "pigs" "in the farm" (which is consistent with the training corpus). The system reads the sentence after the word segmentation, and after the foregoing encoding-decoding process, outputs a converted sequence, for example, "Pigs" "in the farm" "are" "as many as" "grains of sand on the ground". Further, the system automatically identifies, in the encoding phase using a learned system parameter, that "7,634" is a relatively large number and corresponds to "are as many as grains of sand on the ground", and identifies that other sections should be directly copied to an output end.

The system parameter is used to control a conversion style of a representation manner. The parameter is automatically learned from the training corpus. In an embodiment, the conversion style learned by the system is usually consistent with a representation conversion style in the training corpus. To achieve more diverse conversion of the target representation manner, the sequence learning model needs to use a large quantity of diverse training languages, to learn diverse conversion styles.

It should be noted that the foregoing example merely exemplifies a process of sequence-to-sequence learning, and is not a specific limitation to the process of sequence-to-sequence learning.

Optionally, in another possible implementation, a specific implementation of S402 in which the content explanation apparatus obtains the target representation manner of the target content in the target intelligence type may be obtaining a target representation manner of pre-stored target content in the target intelligence type. The memory explanation apparatus pre-stores a representation manner, in each intelligence type, of the multimedia information delivered to the user by the information delivery apparatus. The target representation manner can be directly obtained through query in S402.

S403. The content explanation apparatus presents the target content to the user in the target representation manner.

In an embodiment, based on different forms of the target representation manner, the content explanation apparatus presents the target content to the user in a manner corresponding to the target representation manner in S403. A specific presentation manner may be playing a target representation manner of a particular style to the user in an audio form, and presenting a manner corresponding to media such as a picture or audio/video to the user by displaying the picture or playing the audio/video.

It should be noted that the presentation manner in S403 is not specifically limited in this embodiment of this application.

Further, in the solution of this embodiment of this application, the process of S401 to S403 may be performed at least one more time during the multimedia information delivery to the user in order to improve the user's understanding of the received multimedia information.

According to the content explanation method provided in this application, the emotion of the user is first identified using an emotion recognition technology, and when the negative emotion of the user is identified, it is determined that the user is confused about the target content, then with the aid of intelligence types in psychology that are used to reflect understanding capabilities of different people on different content presentation manners, the target content is converted into the target representation manner in the target intelligence type that is easy to be understood by the user, and then the target content about which the user is confused is presented to the user in the obtained target representation manner. The intelligence types reflect the understanding capabilities of different people on different content presentation manners. Therefore, content is converted based on an intelligence type. Provided that the converted target representation manner is a conversion manner in an intelligence type of the user, an understanding capability of the user on the target content may be greatly improved, and confusion of the user is cleared up such that effectiveness of human-computer interaction is significantly improved.

Further optionally, corresponding to S402a in which the static intelligence type of the user may also be updated during the multimedia information delivery to the user, as shown in FIG. 5, after S401, the content explanation method provided in this embodiment of this application may further include S404 and S405, to implement updating of the static intelligence type of the user during information delivery to the user.

S404. If the content explanation apparatus identifies a positive emotion showing that the user is clear about the delivered multimedia information, the content explanation apparatus adds 1 to a counter of an intelligence type that is in an intelligence type library of the user and to which a representation manner of the multimedia information belongs when the content explanation apparatus identifies the positive emotion of the user.

S405. At a preset moment, or when a counter value in the intelligence type library is greater than or equal to a preset threshold, update a static intelligence type of the user to an intelligence type whose counter value is the highest in the intelligence type library.

Figure 7:
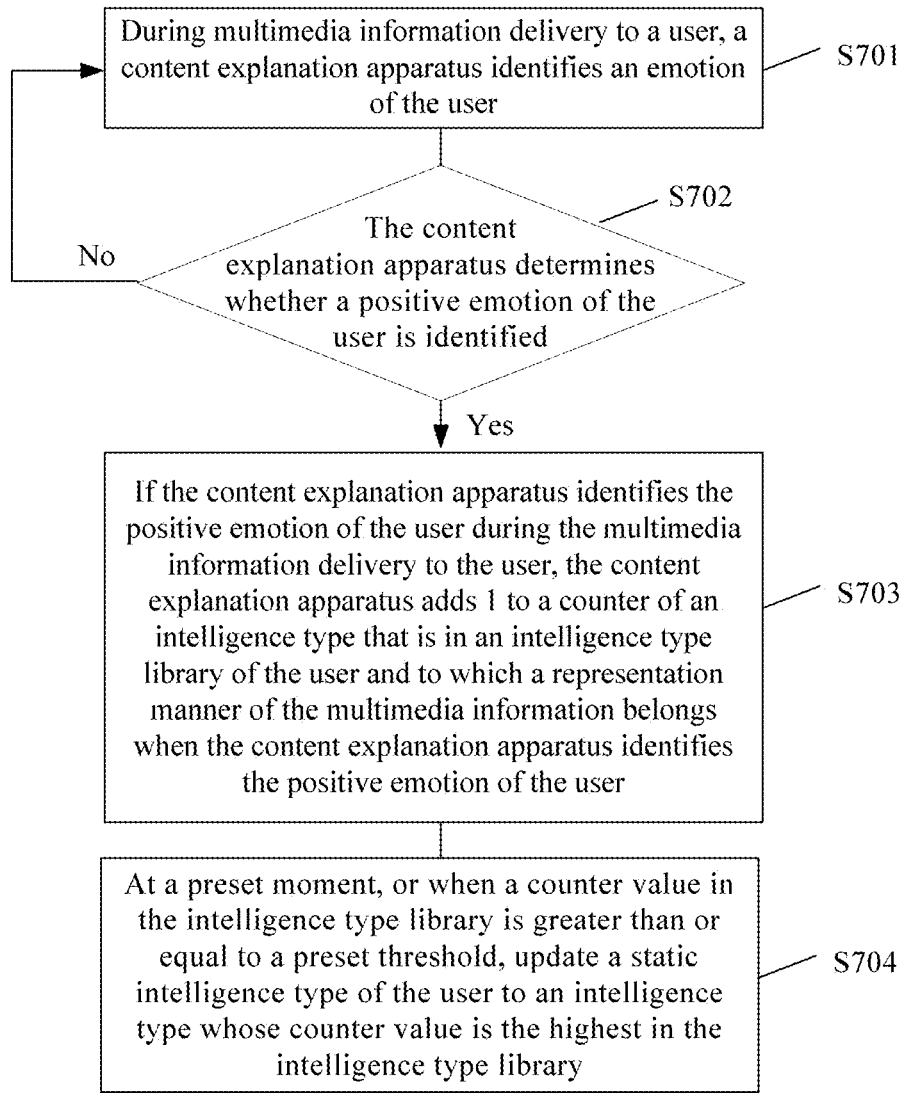
FIG. 7 is a schematic flowchart of updating a static intelligence model of a user according to an embodiment of this application.

Further, as shown in FIG. 7, an implementation process, in S404 and S405, of updating the static intelligence type of the user during the multimedia information delivery to the user may specifically include S701 to S704.

S701. During multimedia information delivery to a user, a content explanation apparatus identifies an emotion of the user.

An implementation of S701 is the same as that of S401. Details are not described herein again.

S702. The content explanation apparatus determines whether a positive emotion of the user is identified.

In S702, if it is determined that the positive emotion of the user is identified in S701, S703 is performed, otherwise, S701 is performed again.

S703. If the content explanation apparatus identifies the positive emotion of the user during the multimedia information delivery to the user, the content explanation apparatus adds 1 to a counter of an intelligence type that is in the intelligence type library of the user and to which a representation manner of the multimedia information belongs when the content explanation apparatus identifies the positive emotion of the user.

S704. At a preset moment, or when a counter value in the intelligence type library is greater than or equal to a preset threshold, update a static intelligence type of the user to an intelligence type whose counter value is the highest in the intelligence type library.

Both the preset moment or the preset threshold may be configured according to requirements in an embodiment, and are not specifically limited in this embodiment of this application.

Further optionally, as shown in FIG. 5, before S402, the content explanation method provided in this application may further include S402c.

S402c. The content explanation apparatus converts the target content into content in a text form.

Further, in S402c, the target content may be converted into the content in the text form using a technical solution such as speech recognition, and this is not specifically limited in this embodiment of this application.

Further optionally, as shown in FIG. 5, after S401, the content explanation method provided in this application may further include S406.

S406. When a negative emotion of the user is identified, the content explanation apparatus controls an information delivery apparatus associated with the content interpretation apparatus to suspend information delivery.

Further, in S406, the content explanation apparatus may send a suspension indication message to the information delivery apparatus associated with the content explanation apparatus, to enable the information delivery apparatus to suspend the information delivery such that the content explanation apparatus explains the target content to the user.

Further optionally, corresponding to S406, as shown in FIG. 5, after S403, the content explanation method provided in this application may further include S407.

S407. If the content explanation apparatus identifies a positive emotion of the user when the target content is presented to the user in the target representation manner, after the target content is presented to the user in the target representation manner, the content explanation apparatus controls the information delivery apparatus associated with the content explanation apparatus to resume the multimedia information delivery to the user.

Further, in S407, the content explanation apparatus may send a resumption indication message to the information delivery apparatus associated with the content explanation apparatus, to enable the information delivery apparatus to resume the multimedia information delivery to the user.

The foregoing mainly describes the solutions provided in the embodiments of this application from the perspective of the working process of the content explanation apparatus. It can be understood that, to implement the foregoing functions, the content explanation apparatus includes a corresponding hardware structure and/or software module for performing the functions. A person skilled in the art should readily appreciate that this application can be implemented in a form of hardware or in a form of a combination of hardware and computer software with reference to units and algorithm steps of examples described in the embodiments disclosed in this specification. Whether a function is performed by hardware or by computer software driving hardware depends on specific applications and design constraints of the technical solutions. A person skilled in the art can use different methods to implement the described function for each particular application, but such an implementation shall not be considered as beyond the scope of this application.

In the embodiments of this application, division of functional modules may be performed on the content explanation apparatus based on the foregoing method examples. For example, the functional modules may be divided in correspondence to the functions, or two or more functions may be integrated into a processing module. The foregoing integrated module may be implemented in a form of hardware, or may be implemented in a form of a software functional module. It should be noted that the division of the modules in the embodiments of this application is an example, and is merely logical function division, and there may be another division manner during actual implementation.

Figure 8:
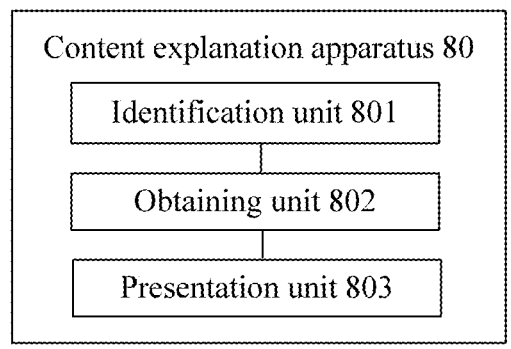
FIG. 8 is a schematic structural diagram of another content explanation apparatus according to an embodiment of this application.

In a case of division of functional modules based on corresponding functions, FIG. 8 shows a possible schematic structural diagram of a content explanation apparatus related in the foregoing embodiment. The content explanation apparatus 80 includes an identification unit 801, an obtaining unit 802, and a presentation unit 803. The identification unit 801 is configured to support the content explanation apparatus 80 to perform the process S401 in FIG. 4 or FIG. 5, the obtaining unit 802 is configured to support the content explanation apparatus 80 to perform the process S402 in FIG. 4 or FIG. 5, and the presentation unit 803 is configured to support the content explanation apparatus 80 to perform the process S403 in FIG. 4 or FIG. 5. All related content of the steps related in the foregoing method embodiment can be used for function descriptions of the corresponding functional modules. Details are not described herein again.

Figure 9:
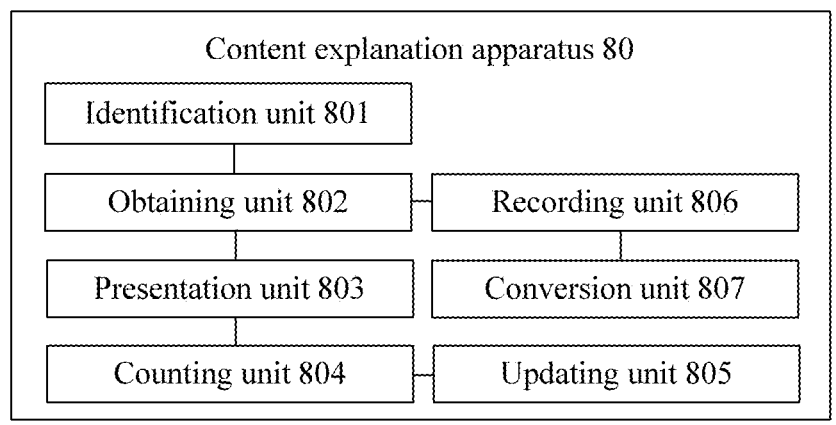
FIG. 9 is a schematic structural diagram of still another content explanation apparatus according to an embodiment of this application.

Further, FIG. 9 shows another possible schematic structural diagram of the content explanation apparatus 80 related in the foregoing embodiment. The content explanation apparatus 80 may further include a counting unit 804, an updating unit 805, a recording unit 806, and a conversion unit 807. The counting unit 804 is configured to support the content explanation apparatus 80 to perform the process S404 in FIG. 5, the updating unit 805 is configured to support the content explanation apparatus 80 to perform the process S405 in FIG. 5, the recording unit 806 is configured to support the content explanation apparatus 80 to perform the process S401a in FIG. 5, and the conversion unit 807 is configured to support the content explanation apparatus 80 to perform the process S402c in FIG. 5.

Figure 10:
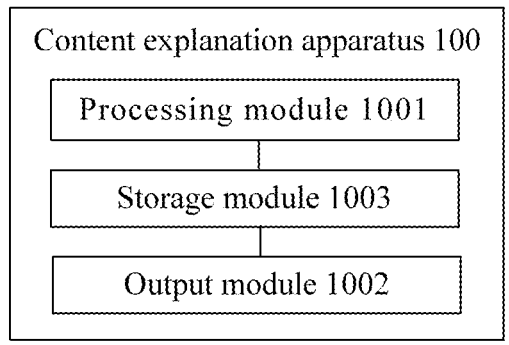
FIG. 10 is a schematic structural diagram of yet another content explanation apparatus according to an embodiment of this application.

In a case of using an integrated unit, FIG. 10 shows still another possible schematic structural diagram of a content explanation apparatus related in the foregoing embodiment. The content explanation apparatus 100 may include a processing module 1001 and an output module 1002. The processing module 1001 is configured to control and manage actions of the content explanation apparatus 100. For example, the processing module 1001 is configured to support the content explanation apparatus 100 to perform the processes S401 and S402 in FIG. 4 or FIG. 5, and/or is configured to support another process of the technology described in this specification. The processing module 1001 is further configured to support the content explanation apparatus 100 to perform the process S403 in FIG. 4 or FIG. 5 using the output module 1002. The output module 1002 is configured to support the content explanation apparatus 100 to interact with the outside. The content explanation apparatus 100 may further include a storage module 1003 configured to store program code and data of the content explanation apparatus 100.

The processing module 1001 may be the processor 301 in an entity structure of the content explanation apparatus 30 shown in FIG. 3, or may be a processor or a controller, for example, may be a CPU, a general-purpose processor, a DSP, an ASIC, an FPGA or another programmable logic device, a transistor logic device, a hardware component, or any combination thereof. The processing module 1001 may implement or execute various example logic blocks, modules, and circuits that are described with reference to the content disclosed in this application. Alternatively, the processor may be a combination for implementing a computing function, for example, a combination of one or more microprocessors or a combination of a DSP and a microprocessor. The output module 1002 may be the output unit 304 in the entity structure of the content explanation apparatus 30 shown in FIG. 3. The storage module 1003 may be the memory 302 in the entity structure of the content explanation apparatus 30 shown in FIG. 3.

When the processing module 1001 is a processor, the storage module 1003 is a memory, and the output module 1002 is an output unit, the content explanation apparatus 100 related in FIG. 10 according to this embodiment of this application may be the content explanation apparatus 30 shown in FIG. 3.

As described above, the content explanation apparatus provided in the embodiments of this application may be configured to implement the methods implemented in the foregoing embodiments of this application. For ease of description, only the parts related to the embodiments of this application are shown. For specific technical details that not disclosed, refer to the embodiments of this application.

Method or algorithm steps described with reference to the content disclosed in this application may be implemented by hardware, or may be implemented by a processor by executing a software instruction. The software instruction may include a corresponding software module. The software module may be stored in a RAM, a flash memory, a ROM, an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor such that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it can be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented electrically or in other forms.

The units described as separate parts may or may not be physically separate, and parts displayed as units may or may not be physical units, may be located in one position, or may be distributed on a plurality of network units. Some or all of the units may be selected according to requirements in an embodiment to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer readable storage medium. The software functional unit is stored in a storage medium and includes several instructions for instructing a computer device (which may be a personal computer, a server, a network device, or the like) to perform some of the steps of the methods described in the embodiments of this application. The foregoing storage medium includes any medium that can store program code, such as a USB flash drive, a removable hard disk, a ROM, a random access memory RAM, a magnetic disk, or an optical disc.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions recorded in the foregoing embodiments or make equivalent replacements to some technical features thereof, without departing from the spirit and scope of the technical solutions of the embodiments of this application.

What is claimed is:

1. A content explanation method, implemented by a content explanation apparatus associated with an information delivery apparatus, wherein the content explanation method comprises:

receiving multimedia information by a user from the information delivery apparatus;

identifying an emotion of the user when receiving the multimedia information;

obtaining a target representation manner of target content when the emotion is identified as a negative emotion, wherein the negative emotion shows that the user is confused about the multimedia information, wherein the target content is content in the multimedia information about which the user is confused, wherein the target representation manner comprises a target intelligence type, and wherein the target intelligence type is a psychological intelligence type preset in an intelligence type library; and presenting the target content to the user in the target representation manner.

2. The content explanation method of claim 1, wherein the target intelligence type is either a static intelligence type of the user that is pre-stored in the content explanation apparatus, or another intelligence type that is in a preset intelligence type sequence and that is not used by the content explanation apparatus to convert the target content for the user, and wherein the preset intelligence type sequence comprises an intelligence type.

3. The content explanation method of claim 2, wherein after identifying the emotion of the user, the content explanation method further comprises adding one to a counter of the intelligence type when the emotion identified is a positive emotion that shows the user is clear about the multimedia information that is delivered, wherein the intelligence type is in the intelligence type library of the user and is a representation manner to which the multimedia information belongs when the emotion identified is the positive emotion of the user, and wherein values of counters of different intelligence types of the user are recorded in the intelligence type library.

4. The content explanation method of claim 3, wherein after adding one to the counter of the intelligence type, the content explanation method further comprises updating the static intelligence type of the user to the intelligence type with a counter value that is highest in the intelligence type library either at a preset moment or when the counter value in the intelligence type library is greater than or equal to a preset threshold.

5. The content explanation method of claim 1, wherein before obtaining the target representation manner of the target content in the target intelligence type, the content explanation method further comprises separately recording the multimedia information in a segmented manner based on a preset period to obtain an information segment, wherein the content about which the user is confused comprises a target information segment, and wherein a moment at which the negative emotion is identified is comprised in a recording period of the target information segment.

6. The content explanation method of claim 1, wherein before obtaining the target representation manner of the target content in the target intelligence type, the content explanation method further comprises:
obtaining an information segment within a preset duration before a moment at which the emotion identified is the negative emotion in the multimedia information when identifying the negative emotion of the user; and
using the information segment as the target content.

7. The content explanation method of claim 1, wherein before obtaining the target representation manner of the target content in the target intelligence type, the content explanation method further comprises converting the target content into content in a text form.

8. The content explanation method of claim 1, wherein obtaining the target representation manner of the target content in the target intelligence type comprises:
obtaining the target content;
obtaining the target intelligence type; and
converting the target content through sequence-to-sequence learning to obtain the target representation manner of the target content in the target intelligence type.

9. A content explanation apparatus configured to explain multimedia information about which a user is confused, wherein the content explanation apparatus comprises:
a processor; and
a memory coupled to the processor and storing instructions that, when executed by the processor, cause the content explanation apparatus to be configured to:
receive the multimedia information by the user from an information delivery apparatus;
identify an emotion of the user when the user receives the multimedia information, wherein the information delivery apparatus is associated with the content explanation apparatus;
obtain a target representation manner of target content when the emotion is identified as a negative emotion, wherein the negative emotion shows that the user is confused about the multimedia information, wherein the target content is content in the multimedia information about which the user is confused, wherein the target representation manner comprises a target intelligence type, and wherein the target intelligence type is a psychological intelligence type preset in an intelligence type library; and
present the target content to the user in the target representation manner.

10. The content explanation apparatus of claim 9, wherein the target intelligence type is either a static intelligence type of the user that is pre-stored in the content explanation apparatus, or another intelligence type that is in a preset intelligence type sequence and that is not used by the content explanation apparatus to convert the target content for the user, and wherein the preset intelligence type sequence comprises the intelligence type.

11. The content explanation apparatus of claim 10, wherein the instructions further cause the content explanation apparatus to be configured to add one to a counter of the intelligence type when an identified emotion is a positive emotion that shows the user is clear about the multimedia information that is delivered, wherein the intelligence type is in the intelligence type library of the user and is a representation manner to which the multimedia information belongs when the identified emotion is the positive emotion of the user, and wherein counts of different intelligence types of the user are recorded in the intelligence type library.

12. The content explanation apparatus of claim 11, wherein after the processor adds one to the counter of the intelligence type, the instructions further cause the content explanation apparatus to be configured to update the static intelligence type of the user to the intelligence type with a counter value that is highest in the intelligence type library either at a preset moment or when the counter value in the intelligence type library is greater than or equal to a preset threshold.

13. The content explanation apparatus of claim 9, wherein before obtaining the target representation manner of the target content in the target intelligence type, the instructions further cause the content explanation apparatus to be configured to separately record the multimedia information in a segmented manner based on a preset period to obtain an information segment, wherein the content about which the user is confused comprises a target information segment, and wherein a moment at which the negative emotion is identified is comprised in a recording period of the target information segment.

14. The content explanation apparatus of claim 9, wherein before obtaining the target representation manner of the target content in the target intelligence type, the instructions further cause the content explanation apparatus to be configured to obtain an information segment within preset duration before a moment at which the negative emotion is identified in the multimedia information delivered to the user by the information delivery apparatus and use the information segment as the target content when the content explanation apparatus identifies the negative emotion of the user.

15. The content explanation apparatus of claim 9, wherein before obtaining the target representation manner of the target content in the target intelligence type, the instructions further cause the content explanation apparatus to be configured to convert the target content into content in a text form.

16. The content explanation apparatus of claim 9, wherein the instructions further cause the content explanation apparatus to be configured to:
obtain the target content;
obtain the target intelligence type; and
convert the target content through sequence-to-sequence learning to obtain the target representation manner of the target content in the target intelligence type.

17. The content explanation apparatus of claim 9, wherein the target intelligence type is either a static intelligence type of the user that is pre-stored in the content explanation apparatus, or another intelligence type that is in a preset intelligence type sequence and that is not used by the content explanation apparatus to convert the target content for the user, and wherein the preset intelligence type sequence comprises an intelligence type.

18. A computer program product comprising computer-executable instructions stored on a non-transitory computer-readable medium that, when executed by a processor, cause a content explanation apparatus to:
receive multimedia information by a user from an information delivery apparatus;
identify an emotion of the user when the user receives the multimedia information;
obtain a target representation manner of target content when the emotion is identified as a negative emotion, wherein the negative emotion shows that the user is confused about the multimedia information, wherein the target content is content in the multimedia information about which the user is confused, wherein the target representation manner comprises a target intelligence type, and wherein the target intelligence type is a psychological intelligence type preset in an intelligence type library; and
present the target content to the user in the target representation manner.

19. The computer program product of claim 18, wherein the target intelligence type is either a static intelligence type of the user that is pre-stored in the content explanation apparatus, or an intelligence type that is in a preset intelligence type sequence and that is not used by the content explanation apparatus to convert the target content for the user, and wherein the preset intelligence type sequence comprises the intelligence type.

20. The computer program product of claim 19, wherein the computer-executable instructions further cause the content explanation apparatus to be configured to add one to a counter of the intelligence type when the emotion of the user is identified as a positive emotion that shows the user is clear about the multimedia information, wherein the intelligence type is in the intelligence type library of the user and a representation manner to which the multimedia information belongs when the emotion identified is the positive emotion of the user, and wherein counts of different intelligence types of the user are recorded in the intelligence type library.

* * * * *